US008195172B2

(12) United States Patent
Frieder et al.

(10) Patent No.: US 8,195,172 B2
(45) Date of Patent: *Jun. 5, 2012

(54) PROCESS TO ALLOCATE CHANNELS IN A SECTORIZED AND TIERED CELLULAR NETWORK

(75) Inventors: Ophir Frieder, Chicago, IL (US); Vincent AnhDzung Nguyen, Chicago, IL (US); Peng-Jun Wan, LaGrange Park, IL (US)

(73) Assignee: Illinois Institute of Technology, Chicago, IL (US)

( * ) Notice: Subject to any disclaimer, the term of this patent is extended or adjusted under 35 U.S.C. 154(b) by 1666 days.

This patent is subject to a terminal disclaimer.

(21) Appl. No.: 10/160,481

(22) Filed: May 31, 2002

(65) Prior Publication Data
US 2003/0190918 A1 Oct. 9, 2003

Related U.S. Application Data

(63) Continuation-in-part of application No. 10/114,786, filed on Apr. 3, 2002.

(51) Int. Cl.
*H04W 72/00* (2009.01)
(52) U.S. Cl. ...... 455/450; 455/447; 455/63.4; 455/63.1; 455/422.1; 455/446; 455/67.11; 455/509; 455/524
(58) Field of Classification Search .................. 455/450, 455/446, 447, 509, 63.4, 25; 370/329, 330; 709/226
See application file for complete search history.

(56) References Cited

U.S. PATENT DOCUMENTS

| 4,128,740 A | 12/1978 | Graziano |
| 4,144,411 A | 3/1979 | Frenkiel |
| 5,073,971 A | 12/1991 | Schaeffer |
| 5,111,534 A | 5/1992 | Benner |
| 5,268,694 A | 12/1993 | Jan et al. |
| 5,307,507 A | 4/1994 | Kanai |
| 5,365,571 A | 11/1994 | Rha et al. |
| 5,428,818 A | 6/1995 | Meidan et al. |
| 5,555,257 A | 9/1996 | Dent |
| 5,594,941 A | 1/1997 | Dent |
| 5,619,503 A | 4/1997 | Dent |

(Continued)

FOREIGN PATENT DOCUMENTS

EP 1 028 599 A2 2/2000
(Continued)

OTHER PUBLICATIONS

Li-Chung Wang: *A New Cellular Architecture Based on Interleaved Cluster Concept*, IEEE Transaction on Vehicular Technology, vol. 48, No. 6, pp. 1809-1818, Nov. 1999.

(Continued)

*Primary Examiner* — Willie J Daniel, Jr.
(74) *Attorney, Agent, or Firm* — Pauley Petersen & Erickson

(57) ABSTRACT

The invention disclosed is a process to allocate channels in a sectorized and tiered cellular network. A system of allocating cellular frequencies (channels) to the sectors among the outer tier of cells within a tile is disclosed which maximizes channel set usage within the tile while minimizing co-channel interference between cells. Any unused, or remaining, frequencies for the outer tier of that cell may then be allocated to an inner tier of the cell that has not had a channel allocated thereto. No additional infrastructure or maintenance set-up is required under this technique for allocating the channel to the additional transceiver and a very high degree of channel utilization is achieved.

20 Claims, 9 Drawing Sheets

U.S. PATENT DOCUMENTS

| | | | |
|---|---|---|---|
| 6,021,309 | A | 2/2000 | Sherman et al. |
| 6,078,815 | A | 6/2000 | Edwards |
| 6,127,988 | A | 10/2000 | McNichol |
| 6,201,801 | B1 | 3/2001 | Dent |
| 6,212,385 | B1 | 4/2001 | Thomas et al. |
| 6,212,386 | B1 | 4/2001 | Briere et al. |
| 6,269,245 | B1 * | 7/2001 | Li et al. ............ 455/450 |
| 6,301,233 | B1 | 10/2001 | Ku et al. |
| 6,311,068 | B1 | 10/2001 | Leung et al. |
| 6,320,867 | B1 | 11/2001 | Bellenger et al. |
| 6,339,708 | B1 * | 1/2002 | Wang ............ 455/447 |
| 6,522,885 | B1 * | 2/2003 | Tang et al. ............ 455/447 |
| 6,643,277 | B2 * | 11/2003 | Garrison et al. ............ 370/329 |
| 6,748,218 | B1 * | 6/2004 | Johnson et al. ............ 455/446 |
| 6,915,133 | B2 * | 7/2005 | Wang ............ 455/446 |
| 7,010,304 | B1 * | 3/2006 | Zhang et al. ............ 455/446 |
| 2004/0106411 | A1 * | 6/2004 | Nguyen et al. ............ 455/447 |

FOREIGN PATENT DOCUMENTS

| | | |
|---|---|---|
| WO | WO 00/79704 A1 | 12/2000 |
| WO | WO 01/76105 A2 | 10/2001 |

OTHER PUBLICATIONS

Vincent A. Ngugyen et al.: *Channel Alternation and Rotation for Tri-sectored Directional Antenna Cellular Systems,* IEEE Vehicular Technology Conference-Fall, Atlantic City, New Jersey, Oct. 2001.

* cited by examiner

FIG.10  NARROW BEAM
(PRIOR ART)

PROCESS TO ALLOCATE CHANNELS IN A SECTORIZED AND TIERED CELLULAR NETWORK

This Patent application is a continuation-in-part Patent Application of co-pending patent application Ser. No. 10/114,786, filed on 3 Apr. 2002.

BACKGROUND OF THE INVENTION

1. Field of the Invention

The present invention relates to tiered and sectorized cellular communication networks and more particularly to the allocation/assignment of radio frequencies, also referred to as channels, among the sectors and tiers across a group of cells.

2. Discussion of the Related Art

Cellular communications frequencies, or channels, are limited, expensive, and in great demand. Therefore, the goal of the cellular communications system operator is to maximize cellular usage with the smallest number of channels. Co-channel interference degrades communications quality, further restricting the ability of the cellular operator to provide reliable service with minimal channels. Rebuilds of existing system infrastructure are expensive and therefore undesirable.

Referencing FIG. 1, those persons having ordinary skill in the art will recognize that for purposes of the present discussion, a cell 21 is an area controlled by a central base station 23 with a multiple number of assigned frequencies, or channels. Each channel defines a sector, collectively 25, which is a geographic area covered by one frequency within a cell 21. It is known that cellular network operators, using known and available computer systems, will create tiered cells in areas of especially heavy cellular traffic. A tiered cell, such as the two-tiered cell of FIG. 1, is known to have an outer tier 33 and an inner tier 31. The outer tier 33 in a tri-sectorized cell is represented by the three sections 25 of 120-degree directional antennas previously discussed. The inner tier 31 of the tiered cell 21 is defined by an additional transceiver. This additional transceiver is generally a low power, omni-directional antenna, as indicated by the circle of coverage 35 within the center of the cell.

Referencing FIG. 2, within a cellular system, or coverage area 19, a tile, also sometimes called a cluster, 27, e.g. 27a, 27b, and 27c, is a pattern of contiguous cells mapped with complete frequency usage and repetition, i.e., a number of cells in a nonrepeating pattern which have had channels assigned thereto.

In a cellular system 19, it is conventional to employ three 100-120 degree directional antennae at each base station 23 to provide a cell 21 with three sectors 25, i.e., the cell 21 is trisectorized. The frequencies allotted to the cell are then reused in a simple fixed pattern to derive tiles of, e.g., 3, 4, or 7 cell types dependant upon the number of frequencies available to the system operator for supporting the desired channel separation. Based on the current fixed channel assignment schemes, three disjoined channel sets are assigned to each base station and repeated uniformly in all tiles to provide equidistant separation among co-channel cells, i.e., cells using the same frequencies. In FIG. 2 for example, the operator uses nine channels to supply the three adjacent cell types, A, B, and C. Cell type A uses channels 1, 4, and 7. Cell type B, utilizes channels 2, 5, and 8. Cell type C utilizes channels 3, 6, and 9. However, the conventional fixed pattern of channel allocation does not take full advantage of antenna directivities and channel allocation schemes to maximize frequency reuse.

Maximum efficiency would generally call for the shortest channel reuse distance and the smallest number of cell types. Known schemes proposed to maximize channel reuse within a cellular system have included interleaved/rotated channel assignments as presented in the paper Wang, *A New Cellular Architecture based on an Interleaved Cluster Concept*, IEEE Transactions on Vehicular Technology, vol. 48. no. 6, pp. 1809-1818, November 1999. The interleaved system of Wang, however, will not support wide band cellular systems and may require rebuilds or relocations for additional base stations. U.S. Pat. No. 6,311,068 to Leung, et al. suggests a channel rotation scheme but calls for rebuild using four 90-degree directional antennae. Certain details of the concept of the present invention have been discussed in the paper Nguyen, et al., *Channel Alternation and Rotation For Trisectored Directional Antenna Cellular Systems*, IEEE Vehicular Technology Conference-Fall, Atlantic City, N.J., October 2001, which is herein incorporated by reference.

What is needed in the art is an efficient system of channel allocation supporting the present cellular infrastructure without rebuilds, to increase cellular traffic without degrading the quality of transmission.

SUMMARY OF THE INVENTION

The present invention provides for the above-stated need by a channel alternation and rotation scheme (CAR) having a conceptually simple, although not intuitively obtainable, technique that locally utilizes more than the minimum number of channels needed for a simple rotation allocation to achieve a globally greater coverage with an overall demand for less channels. Further, to accommodate a tiered and sectorized cellular system, a technique of channel alternation and rotation in a tiered cellular system (CART), the present invention additionally provides for allocating channels to the inner tier.

The present invention generally provides a process to allocate channels in a sectorized cellular network. A system of allocating cellular frequencies, or channels, to the sectors among the cells within a tile is disclosed which minimizes reuse distance and maximizes channel usage within the tile while minimizing co-channel interference between cells. According to certain aspects of the present invention, an algorithm is presented wherein a grid of cells may be indexed by row and column in a first step. A second step then designates, labels, or applies, the cell types in appropriate positions on the grid. Distinct channel groups are selected for each cell type and the sectors of the cells have the channel groups allocated thereto in a manner so as to minimize co-channel interference. The present invention can further support multiple sectorized technologies such as the currently used broad beam and narrow beam cellular technology and requires no infrastructure rebuild.

By alternating and rotating the channel assignments across sectors, what is a seemingly locally poor channel choice utilizing additional local channels, is actually a globally good algorithm that is more efficient in terms of the total number of channels used.

According to one aspect of the present invention, frequencies are assigned in an S+X group, where S equals the number of sectors within a cell and X is the additional number of channels locally used in each cell type. The channels are divided into a rotating group and an alternating group. As a row of cells has the frequencies allocated to the sectors, the rotating frequency allocations are rotated between columns, i.e., positions of frequency sectors between the cells of a given type are revolved between or among a given group of sectors (i.e., a channel set). The alternating group channels are alternated, i.e., substituted between cells of sequential columns. Rotating and alternating channel pairs may then be reversed in their designation between rows to minimize co-channel, and especially front lobe, interference. This allocation process can result in a shorter reuse distance, less cell types, and the consequent use of a smaller number of frequencies to support the same number of simultaneous users, or conversely, a greater number of simultaneous users within a fixed channel allotment. Cells of the same type may occur adjacently with sufficient channel separation to avoid interference. Thus, a tile, for example, may have only two cell types, with each cell type utilizing four channels, resulting in a so called 2×(3+1) reuse plan, or more generally an N×(S+X) reuse plan where N designates the number of cell types, S designates the number of sectors, and X designates the number of additional channels necessary to complete the alternation scheme.

In some embodiments, aspects of the present invention may allow a tile to be comprised of first and second, or A-type and B-type trisectorized cells. A-type cell columns and rows alternate with B-type cell columns and rows, with columns having adjacent co-channel cells while the co-channel cells in the rows are separated by sectors of opposite cell types. At least one additional channel is added to the channel group required for the number of sectors per cell, e.g., 3+1 for a trisectorized cell. For a given row, a rotating pair is selected for placement in the given sectors, e.g., a and b sectors, and rotated at each column change. Another given sector, e.g., c sector, is given one of the pair of alternating channels and the alternating channel is switched for that given sector at each column. When beginning the next row of the same cell type, the alternating pair becomes the rotating pair and the rotating pair becomes the alternating pair. The first channel allocation of the alternating row is selected to avoid front lobe interference with the previous row of that type. Thus, e.g., in a 2×(3+1) reuse plan, with only eight channels and two cell types, a tile of eight cells may be utilized to cover any cellular system. The present method will, of course, also work for other multiples of cell type and sector division in common use.

In another aspect of the invention, the channel alternation and rotation scheme may be used in conjunction with an expanded algorithm to increase the efficiency of tiered sectorized networks. In this aspect of the invention, after the initial cell indexing and designation algorithm portion is performed and the outer, sectorized, tier of the cell has channels allocated according to the channel alternation and rotation technique, the unused remaining alternating channel, or channels, for that cell can be allocated to the inner tier, or tiers, needing channel allocation.

DETAILED DESCRIPTION OF PRESENTLY PREFERRED EMBODIMENTS

The present invention is described below in terms of an exemplary embodiment of two trisectorized cell types for purposes of clarity and ease of explanation. The person having ordinary skill in the art will appreciate that the techniques and systems described herein can be applied to a number of sectorized cellular communications systems using currently employed computer systems and are not intended to be limited to the described exemplary embodiments. For example, the techniques described may be applied to cellular systems with a greater number of sectors or cell types, or less number of cell types.

Figure 1:
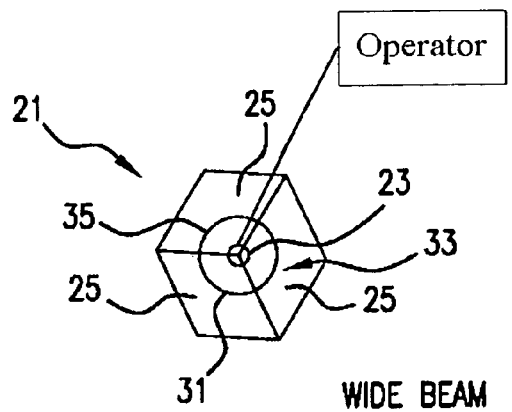
FIG. 1 is a schematic of a known trisectorized two-tier cell of the wide beam transmission cell type.
Figure 2:
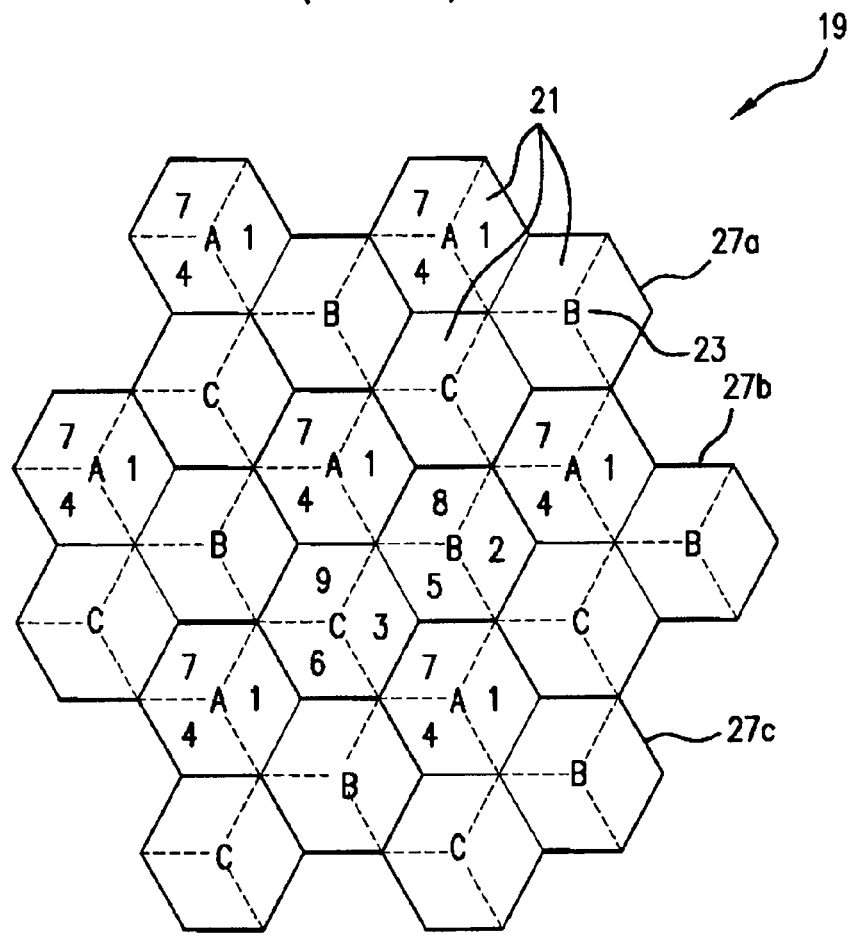
FIG. 2 is a schematic of a traditional frequency reuse layout having three cell types per tile and three sectors within a cell.
Figure 3:
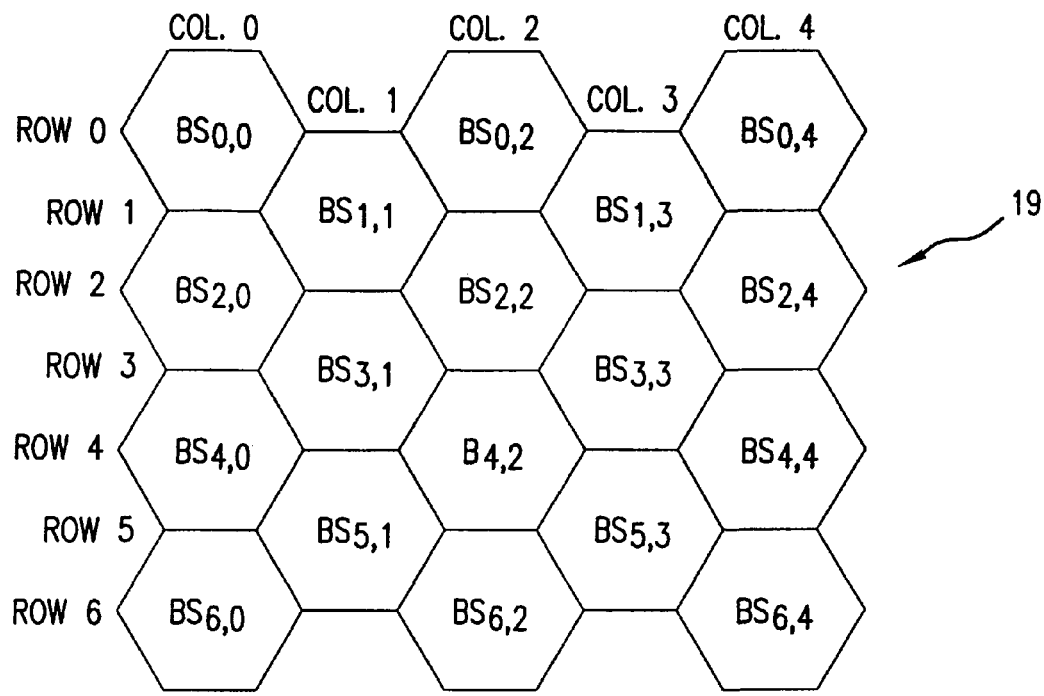
FIG. 3 is a schematic of a 7 row, 5 column grid of cells indexed according to the scheme of the present invention.

Referencing FIG. 3, a cellular system 19 has eighteen hexagonal wide beam cells arrayed in a grid of five columns (columns 0-4) and 7 rows (rows 0-6). Columns 0, 2, and 4 have four cells while columns 1 and 3 have three cells. Rows 0, 2, 4, and 6 have three cells. Rows 1, 3, and 5 have two cells. To index, or label the cells, the base stations central to the cells are designated $BS_{i,j}$, with i=row and j=column, starting in the upper left hand corner with i=0 and j=0.

Figure 4:
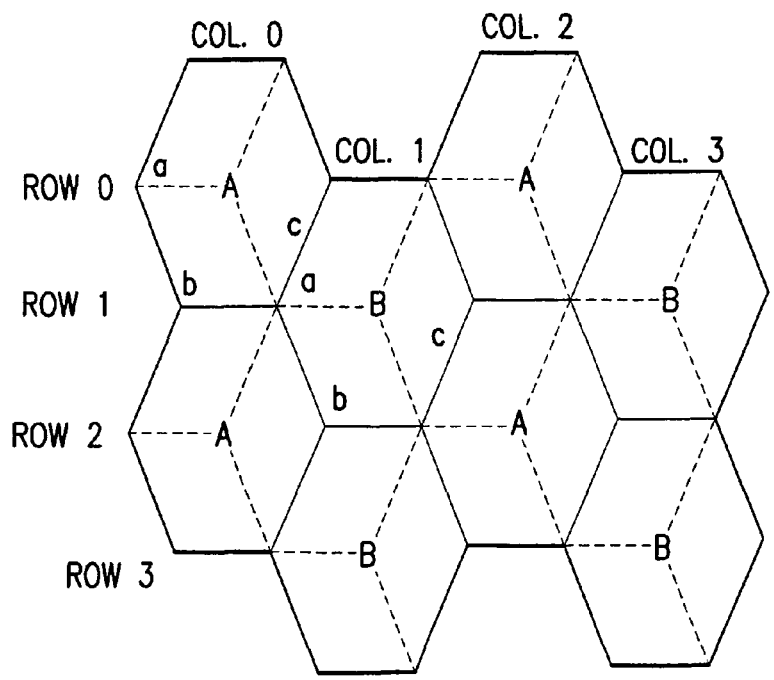
FIG. 4 is a schematic of a 4 row, 4 column grid of cells to be mapped according to a 2×(3+1) reuse plan of the present invention, with the three sectors labeled by lower case letters and two base station types labeled in upper case letters.
Figure 5:
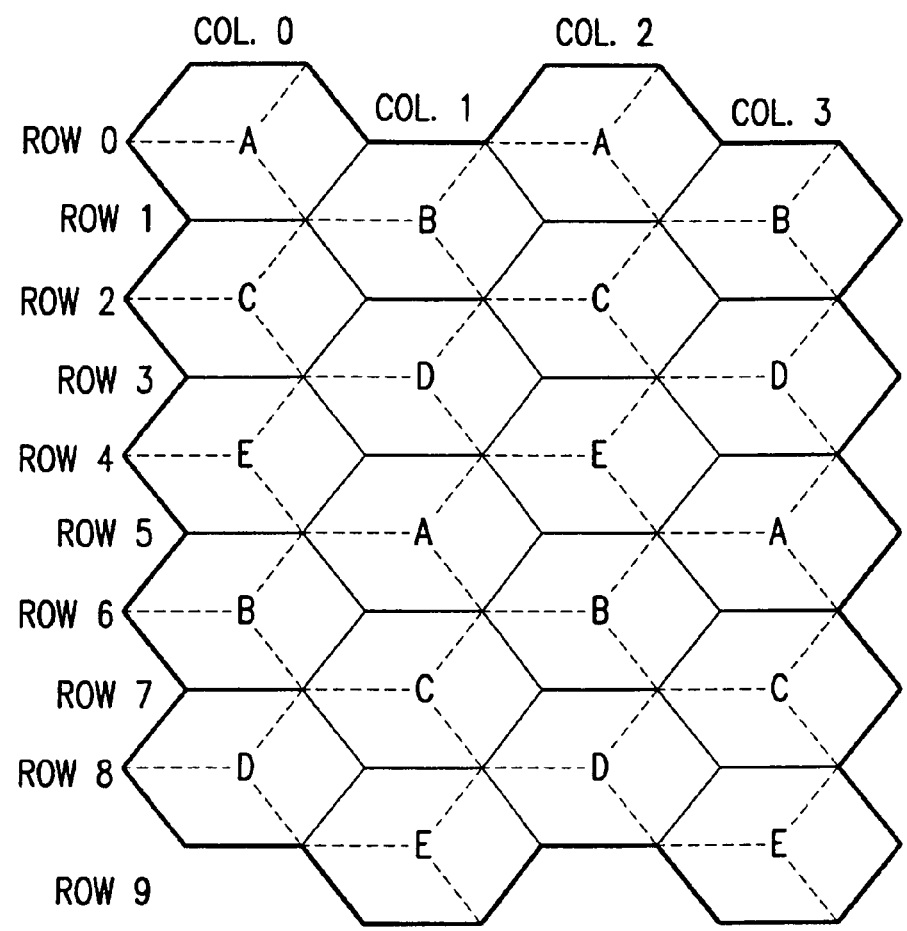
FIG. 5 is a schematic of a 10 row, 4 column grid of cells to be mapped according to a 5×(3+1) reuse plan of the present invention, with the five base station types labeled in upper case letters.

Referencing FIG. 4, after a determination of interference requirements for a given cellular system layout and technology, it is determined that only two cell types are needed, designated here as A and B. Even rows and columns (0 and 2) are designated A-type. Odd rows and columns (1 and 3) are designated B-type. In the system shown in FIG. 5, after a determination of interference requirements, it is determined that five cell types are needed, designated here as A, B, C, D and E. In FIG. 5, rows contain one cell type while columns contain each cell type.

An exemplary algorithm for cell indexing and designation utilizing four cell groupings per cell type is set forth below. The person having ordinary skill in the art will appreciate that larger index sequences or different starting points within the grid, or both, may be practiced within the spirit of the present invention and lead to similar results.

a) determining the number (N) of cell types required within the cellular communications system based on a co-channel interference requirement;

b) assigning ordinals to each of the number of cell types and setting CurrentCellType to the first cell type;

c) labeling the cells by cell type according to:

i) if N is even:

ii) step 1: label cells $BS_{i,j}$, $BS_{i,j+2}$, $BS_{i+N,j}$, and $BS_{i+N,j+2}$ as CurrentCellType, (where i=row and j=column)

iii) step 2: increase i by 1,
change CurrentCellType to the cell type having the ordinal next in sequence,
if the ordinal of CurrentCellType is even set j=j+1, if ordinal is odd set j=j−1, iv) Step 3: repeat from c) ii) step 1 for all cell types of the tile, v) if N is odd:

vi) step 1: label cells $BS_{i,j}$, $BS_{i,j+2}$ as CurrentCellType, if the ordinal of CurrentCellType is odd, label $BS_{i+N,j+1}$ and $BS_{i+N,j+3}$ with CurrentCellType,
if the ordinal of CurrentCellType is even, label $BS_{i+N,j-1}$ and $BS_{i+N,j+1}$ with CurrentCellType, vii) step 2: increase i by 1,
change CurrentCellType to the cell type having the ordinal next in sequence,
if the ordinal of CurrentCellType is even set j=j+1, if ordinal is odd set j=j−1, viii) Step 3: repeat from c) vi) step 1 for all cell types of the tile.

After designation of the cell types, each cell then has the sectors therein assigned with channels, i.e., the directional antennae of the base stations will be designated to handle particular frequencies. Referencing FIGS. 6-9, a two-cell type grid has channels assigned to trisectorized cells according to the channel alternation and rotation (and reversal) scheme of the present invention. The general algorithm for channel assignment may be stated as:

1) allocate a distinct group of S+X channels for each cell type, where S is the number of sectors in a cell, and X is the number of channels needed to complete an alternation scheme that provides sufficient separation between co-channels,
then for each cell:

2) allocate S of the channels from the cell type distinct group, subject to i) if any of the allocated group of S channels can be rotated to avoid front lobe interference with its nearest co-channel cell, rotate those channels, and ii) if i) cannot be accomplished, alternate a group of channels selected from S+X.

Figure 6:
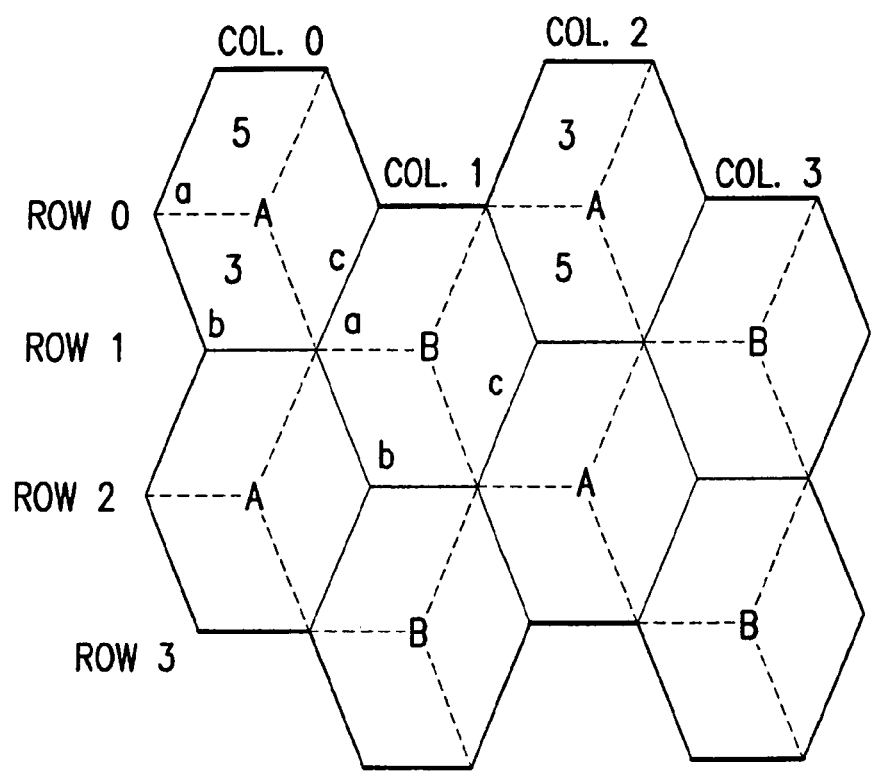
FIG. 6 is a schematic of a 4 row, 4 column grid of cells according to the 2×(3+1) reuse plan of the present invention, with the initial rotation pair placed in sectors a and b, row 0.
Figure 7:
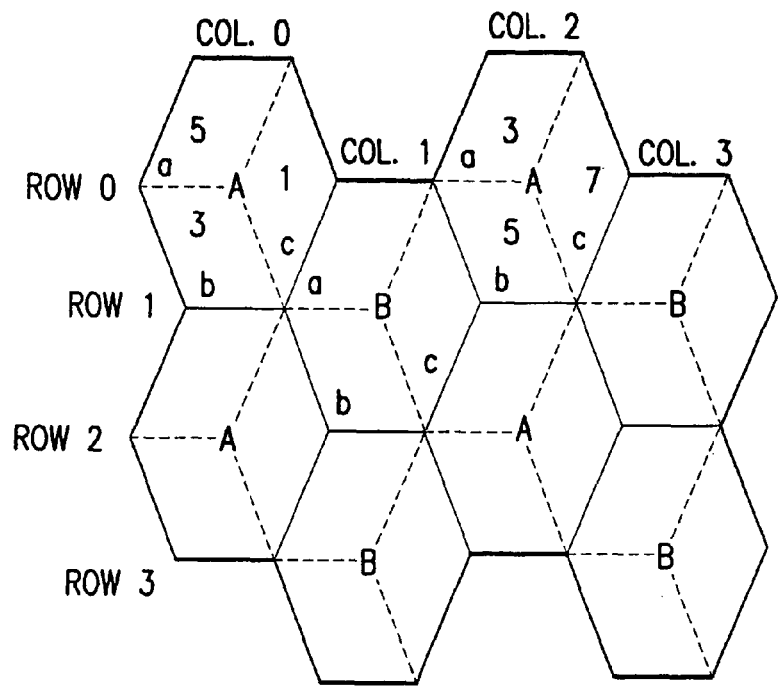
FIG. 7 is a schematic of the 4 row, 4 column grid of cells of FIG. 6 with the initial alternating pair placed in sector c of row 0.

Referencing FIG. 6, two A-type cells of the first row illustrate channel rotation of the present invention. Channels 1, 3, 5, and 7 are allocated for use in A-type cells. Channels 2, 4, 6, and 8 are allocated for use in B-type cells. Channels 3 and 5 are designated the rotating pair for the first row of cells. Cell $BS_{0,0}$ has sectors a and b allocated with channels 5 and 3, respectively. The next cell in row 0, Cell $BS_{0,2}$, has sectors a and b allocated with the rotating pair reversed, or rotated, such that sector a has channel 3 allocated and sector b has channel 5 allocated. Cell $BS_{0,4}$ (not shown until FIG. 9) would then have the rotating pair reversed again such that sectors a and b are allocated with channels 5 and 3, respectively. Referencing FIG. 7, sector c is then subject to allocation by use of the alternating pair of channels 1 and 7. In cell $BS_{0,0}$, sector c is allocated with channel 1. The next cell in row 0, Cell $BS_{0,2}$, has sector c allocated with the alternate channel of the alternating pair, i.e., 7.

Figure 8:
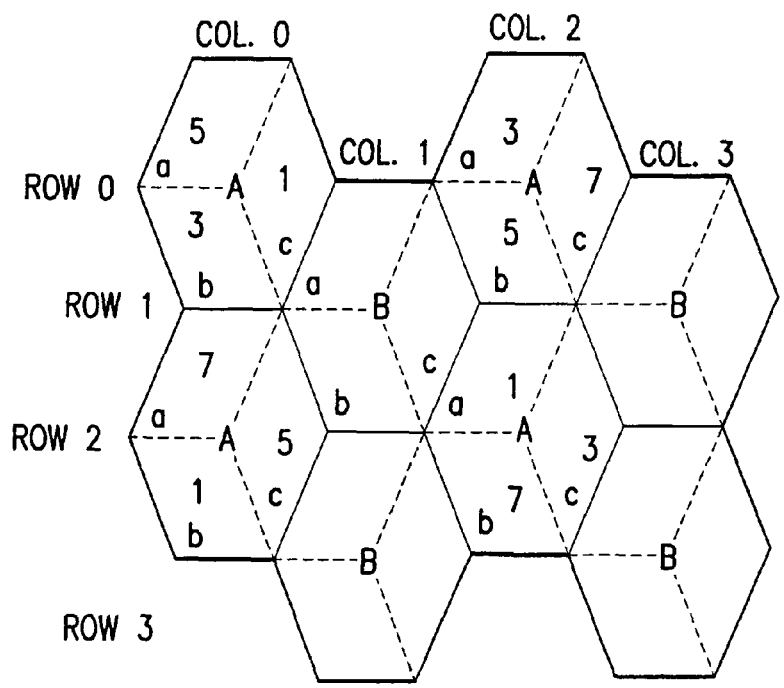
FIG. 8 is a schematic of the 4 row, 4 column grid of cells of FIG. 7 with the alternating pair and rotating pair reversed for allocation in row 2 and the front lobe interference between the c sector of rows 0 and 2 dictating placement of the initial selection of the channel of the alternating pair.
Figure 9:
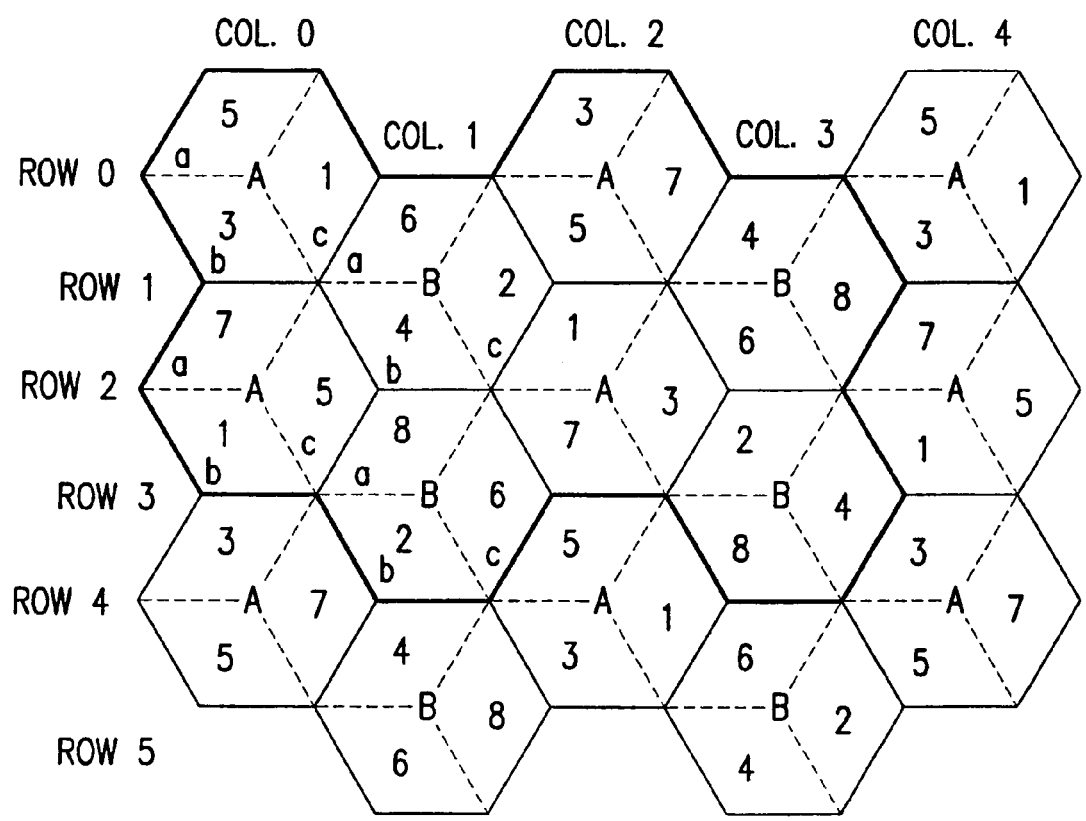
FIG. 9 is a completely allocated 6 row, 5 column grid of cells in a 2×(3+1) reuse plan according to the present invention.

Referencing FIG. 8, the next row of A cells, row 2 has its sectors allocated by reversing the alternating pair and rotating pair channels, i.e., the alternating pair becomes 3, 5 and the rotating pair becomes 1, 7. The rotating pair is placed in $BS_{2,0}$ sectors a and b to avoid front lobe interference, thereby placing channel 7 in sector a. If channel 1 is placed in sector a of $BS_{2,0}$, which is adjacent sector c of $BS_{0,0}$, also having been allocated with channel 1, front lobe interference may happen at the interface of the sectors. Likewise, in sector c, the initial alternating channel is selected to be 5 instead of 3 to avoid front lobe interference with sector b of $BS_{0,0}$, which is already allocated with channel 3. Thus within a row at the column changes, the channel allocations are rotated between designated sectors, and alternated, or substituted, between designated sectors. Between rows, the channel allocations are reversed between the alternating channels and the rotating channels. Thus, the scheme may be referred to as channel alternation, rotation (and reversal), or CAR. Referencing FIG. 9, the channel allocation is then completed for the sectors of the B-type cells using channels 6, 4 as the rotating pair of the first row, 1, of the B-type cells and channels 2, 8 as the alternating pair, thus resulting in a so-called 2×(3+1) reuse plan wherein there are two types of cells with four (three plus one) available channel allocations per cell.

In a conventional reuse system, each channel set, (i.e., a given positional designation of frequencies for sectors a, b, and c) is used once in the tile, thus in a tile of N cells, N is also the reuse factor. In a 2×(3+1) reuse plan, each channel set is reused 3 times in a repeating pattern of N×(S+X) cells. Thus, the reuse factor for the present invention, labeled $N_{car}$, can be generalized as:

$$N_{car} = \frac{Nx(S+X)}{j}$$

where j is the number of times the same channel set is repeated in the pattern. Hence, $N_{car}$ for 2×(3+1), 3×(3+1), 4×(3+1), and 5×(3+1) is 2.7, 4.0, 5.3, and 6.7, respectively. Due to its smaller reuse factor, $N_{car}$=2.7 for a 2×(3+1), versus N=3 for a conventional 3×3, a 2×(3+1) reuse plan of the present invention increases channel capacity by 12.50% over 3×3 plan. Where N=2, or N=1, co-channel cells are contiguous. Thus, antennae with a high front-to-back ratio, e.g., greater than or equal to 25 dB, are recommended to take full advantage of a 2×(3+1), or 1×(3+1) pattern according to the present invention.

Figure 10:
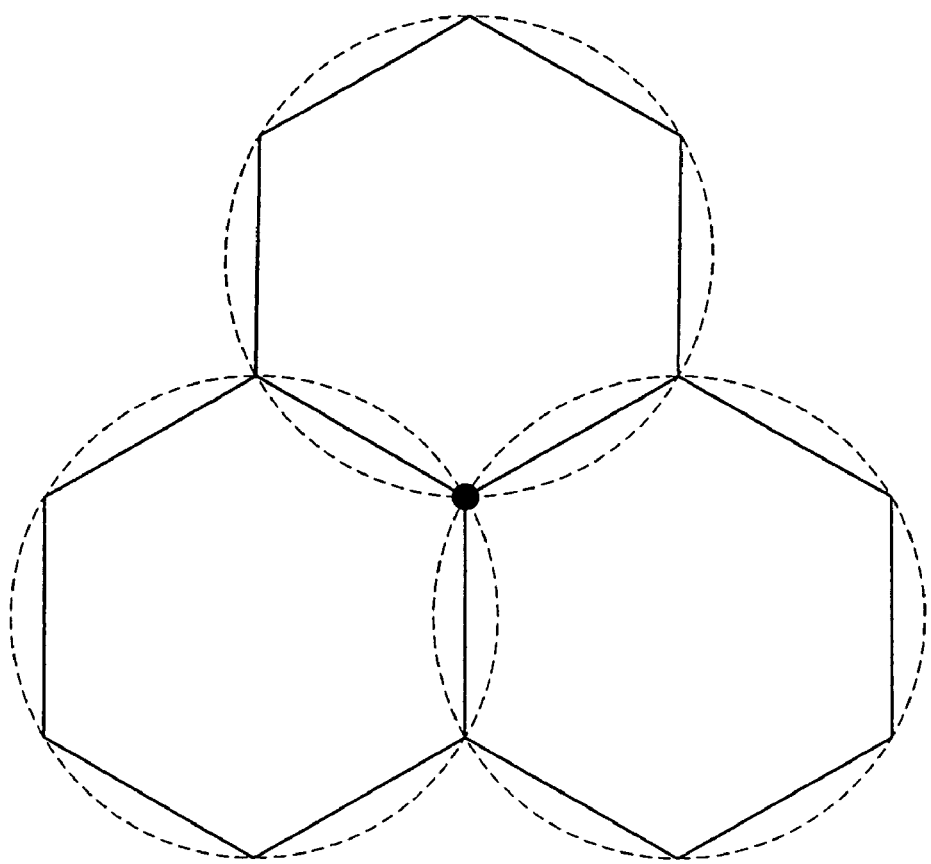
FIG. 10 is a schematic of a trisectorized cell of the narrow beam transmission cell type.

As seen in Table 1, for a Narrow-Beam System, such as illustrated in FIG. 10, and having a 9 dB co-channel interference requirement, the traditional 3×3 reuse plan results in the use of 1 channel per sector, or a 33% channel capacity per cell. An interleaved 2×3 reuse plan as put forth by Wang (supra.) results in a 50 percent channel capacity per cell, resulting in a 50% capacity increment. In the channel alternation and rotation (CAR) scheme of the present invention with a 1×(3+1) channel reuse plan, a 75% channel capacity per cell is achieved resulting in a 125% capacity increment over traditional 3×3 reuse and a 50% increment over the interleaved 2×3 reuse plan. Thus, the person having ordinary skill in the art will appreciate that significant channel capacity gains may be had by utilizing the scheme of the present invention. Tables 2, 3, and 4 show similar significant gains for a narrow beam system with a 14 dB requirement, a wide beam system with a 9 dB requirement, and a wide beam system with a 14 dB requirement, respectively.

TABLE 1

Narrow-Beam System 9 dB Requirement

| Reuse Plan | Capacity Per Cell | Capacity Increment |
|---|---|---|
| Traditional 3 × 3 | 33.33% | NA |
| Interleaved 2 × 3 | 50.00% | 50% |
| CAR 1x(3 + 1) | 75.00% | 125% over Traditional<br>50% over Interleaved 2 × 3 |

TABLE 2

Narrow-Beam System 14 dB Requirement

| Reuse Plan | Capacity Per Cell | Capacity Increment |
|---|---|---|
| Traditional 3 × 3 | 33.33% | |
| Interleaved 3 × 3 | 33.33% | |
| CAR 2x(3 + 1) | 37.50% | 12.50% |

TABLE 3

Wide-Beam System 9 dB Requirement

| Reuse Plan | Capacity Per Cell | Capacity Increment |
|---|---|---|
| Traditional 3 × 3 | 33.33% | |
| Interleaved 3 × 3 | NA for Wide-Beam | |
| CAR 2x(3 + 1) | 37.50% | 12.50% |

TABLE 4

Wide-Beam System 18 dB requirement

| Reuse Plan | Capacity Per Cell | Capacity Increment |
|---|---|---|
| Traditional 7 × 3 | 14.29% | |
| CAR 5x(3 + 1) | 15.00% | 5.00% |
| CAR 4x(3 + 1) | 18.75% | 31.25% |

Various integer values for the N×(S+X) formulations will work to gain good channel usage efficiency within the teachings of the present invention. For another example, good results can be demonstrated generally where X is less than or equal to S and specifically where N is 1 or 2, S is 6, and X is 2 or 4.

Figure 11:
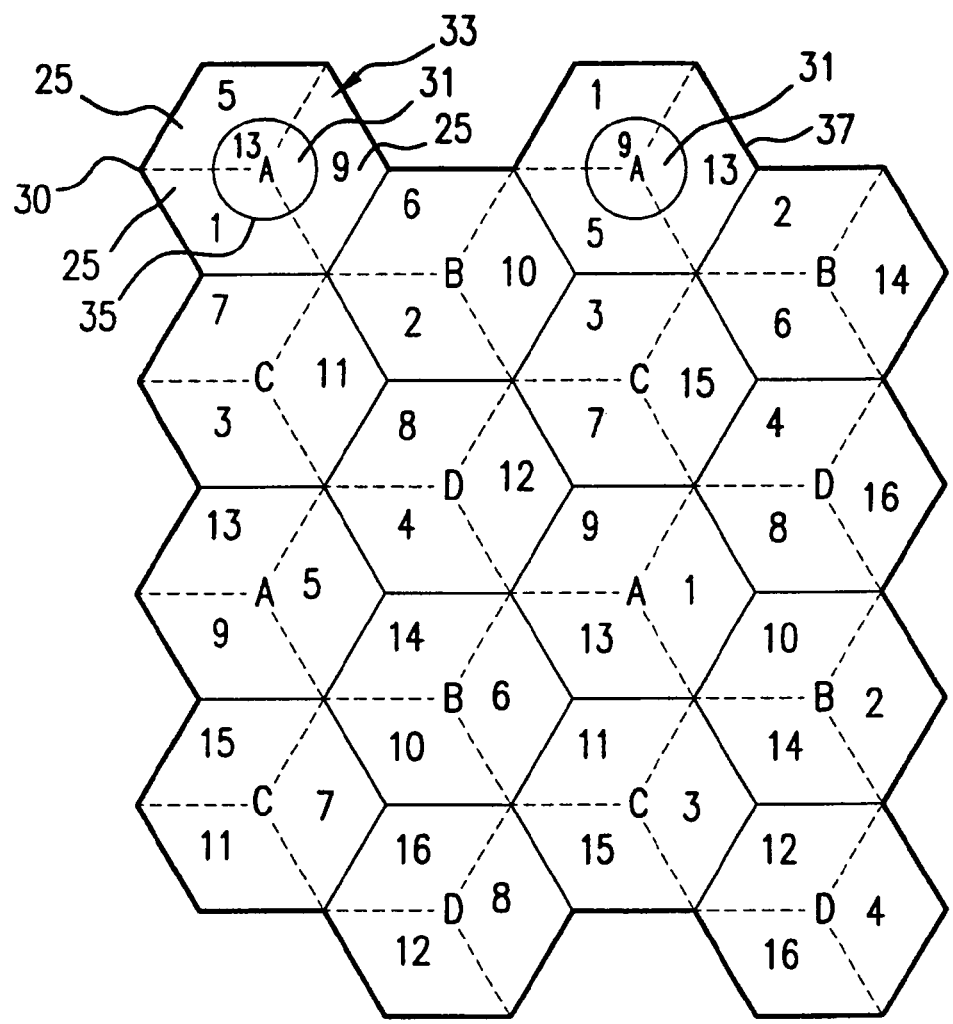
FIGS. 11 and 12 are schematics of a two-tiered cellular system with cells having a trisectorized outer tier and a low power omni-directional inner cell for the broad beam transmission cell type having channel allocation according to the present invention.

Referencing FIG. 11, it is known that cellular network operators will create tiered cells in areas of especially heavy cellular traffic. A tiered cell, such as first tiered cell 30, is known to have an outer tier 33 and an inner tier 31. The outer tier 33 in a tri-sectorized cell is represented by the three sections 25 of 120-degree directional antennas previously discussed. The inner tier 31 of a first tiered cell 30 is defined by an additional transceiver (not shown). This additional transceiver is generally a low power, omni-directional antenna, as indicated by the circle of coverage 35 within the center of a cell. The additional transceiver must have an additional channel set allocated thereto. To make the channel allocation for a tiered cell system uncomplicated and efficient, the present invention will assign the unused member of the alternating pair for the outer tier 33 of that cell to the additional transceiver. In the case of the first and second tiered cells 30, 37 in FIG. 11, the alternating pair for the outer tiers in the illustrated row comprises channels 9 and 13. The first tiered cell 30 has channel 9 of the alternating pair allocated to the outer tier. Thus, the remaining or unused one of the alternating pair, channel 13, is allocated to the inner tier 31 of the first tiered cell 30. For the next, or second, tiered cell 37, channel 13 is of course used as the channel from the alternating pair according to the CAR algorithm. Therefore, the remaining or unused channel 9 is allocated to the inner tier 31 of the second, tiered cell 37.

Figure 12:
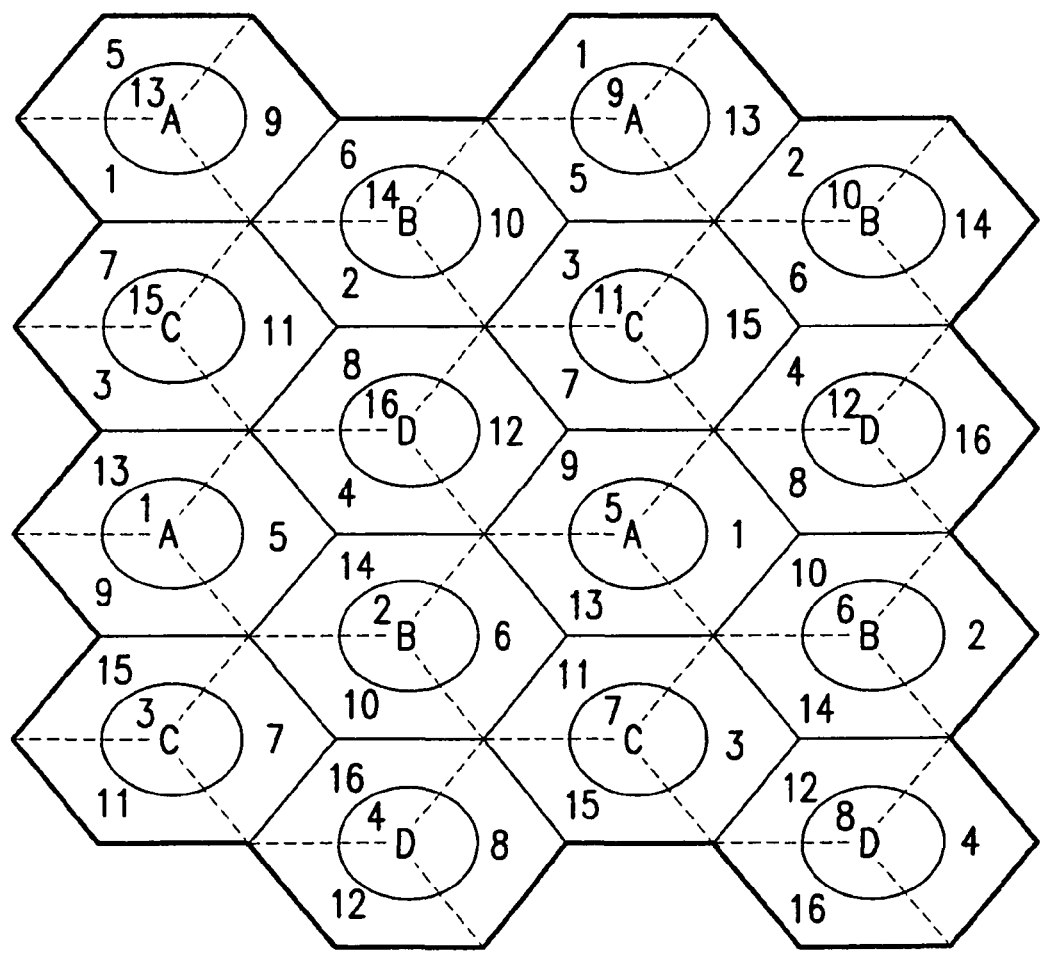

Because the antenna types of the cell type A for the given row of cells are already equipped to use those channels including the alternating pair and rotating pair assigned to that antenna type, here channels 1, 5, 9 and 13; no additional infrastructure or maintenance set-up is required under this technique for allocating the unused channel to the additional transceiver. Further, as long as the number of cell types (N) is greater than two, only tolerable co-channel interference can result from this technique. This elegant and systematic solution of the present invention can be seen to provide utilization of all channels in the exemplary 4×(3+1) sectorized and tiered cellular system shown in FIG. 12, which shows a tile of tiered cells completely allocated according to the CART algorithm.

Thus, it will be understood by the person having ordinary skill in the art that the technique set forth above can be used as an addition to the algorithm for non-tiered sectorized cellular networks, and can be utilized to fully and efficiently assign channels in a tiered sectorized cellular network. It is contemplated that such tiered networks may include cells having more than two tiers. Thus, according to the exemplary embodiment, the outer tier of a cell will have its channels assigned according to the CAR algorithm. The inner tier of a cell will then have its channels assigned by utilizing the unused channel in the alternating group. The inventors thus have named this technique CART, for channel alternation and rotation in tiered cell systems.

Accordingly, the CART algorithm, after indexing the cells and designating the cell types per the CAR designation algorithm portion above, can be used for channel allocation in a tiered and sectorized cellular system according to:

1) allocate a distinct group of S+X channels for each cell type, where S is the number of sectors in an outer tier of a cell, and X is the number of channels needed to complete an alternation scheme that provides sufficient separation between co-channels, then for each cell:

2) allocate S of the channels to the outer tier sectors from the cell type distinct group, subject to
   i) if any of the allocated group of S channels can be rotated to avoid front lobe interference with its nearest co-channel cell, rotate those channels, and
   ii) if i) cannot be accomplished, alternate a group of channels selected from S+X; and 3) allocate alternating channels remaining unused after allocating the sectors of the outer tier from S+X to any tiers of the cell which have not had a channel allocated thereto.

While certain exemplary embodiments have been put forth to illustrate the present invention, these embodiments are not to be taken as limiting to the spirit or scope of the present invention which is defined by the appended claims.

We claim:

1. A method for allocation of channels by a cellular network operator to base stations, where each of the base stations is assigned within one of a plurality of base station cells of a tiered cellular communications system comprising:
   a) indexing the base station cells within a cellular communications system according to rows and columns;
   b) determining a co-channel interference requirement within the cellular communications system;
   c) determining the number (N) of cell types required within the cellular communications system;

d) placing only one cell type in each row;
e) allocating channels to each base station of the base station cells according to:
   i) allocate a distinct group of S+X channels for each cell type, where S is the number of sectors in an outer tier of a cell, and X is the number of channels needed to complete an alternation scheme,
   ii) divide the S+X number of channels into rotating groups and alternating groups,
   iii) designate which sector types of an outer tier of a cell receive members of the rotating group,
   iv) designate which sector types of an outer tier of a cell receive members of the alternating group,
   v) for a first row, first column cell:
      allocate members of the rotating group into the designated rotating group sectors of the first row, first column cell, allocate at least one of the alternating group into the designated alternating group sector or sectors,
   vi) for each succeeding cell in the row, rotate allocation of the members of the rotating group between or among the designated rotating sectors and alternate the allocation of members of the alternating group within the designated alternating group sector or sectors, and
   vii) for an unallocated tier within a cell, allocate an unused member of the alternating group for that cell to the unallocated tier; and
f) operating each of the base stations according to the allocated channels.

2. The method of claim 1 further comprising, allocating members of the alternating group so as to avoid front lobe co-channel interference.

3. The method of claim 1 wherein the alternating group comprises more than one unused member.

4. The method of claim 3 wherein there is more than one unallocated tier within a cell for receiving an unused member of the alternating group.

5. The method of claim 1, wherein each of the base stations comprises directional antennae, and further comprising assigning one of the allocated channels to each of the directional antenna.

6. The method of claim 5, wherein each of the directional antennae receives radio frequencies of the corresponding allocated channel.

7. A method for allocation of channels to base stations within a tiered cellular communications system, wherein a geographic area serviced by the cellular communications system is divided into a plurality of cells, and each of the cells is associated with one of the base stations, and each of the base stations includes at least one antennae and has at least one assigned channel, the method comprising:
   a) indexing the base stations (BS) within a cellular communications system according to rows and columns;
   b) determining a co-channel interference requirement within the cellular communications system;
   c) determining the number (N) of cell types required within the cellular communications system based on a co-channel interference requirement;
   d) placing only one cell type in each row;
   e) allocating channels to each base station of the plurality of cells according to:
      i) allocate a distinct group of S+X channels for each cell type, where S is the number of sectors in an outer tier of a cell, and X is the number of channels needed to complete an alternation scheme providing sufficient separation between co-channels,
      ii) divide the S+X number of channels into rotating groups and alternating groups,
      iii) designate which sector types of the outer tier of a cell receive members of the rotating group,
      iv) designate which sector types of the outer tier of a cell receive members of the alternating group,
      v) for a first row, first column cell:
         allocate members of the rotating group into the designated rotating group sectors of the first row, first column cell,
         allocate at least one of the alternating group into the designated alternating group sector or sectors,
      vi) allocate S of the channels from the cell type distinct group to an outer tier of a cell, subject to:
         A) if any of the allocated group of S channels can be rotated to avoid front lobe interference with its nearest co-channel cell, rotate those channels, and
         B) if A) cannot be accomplished, alternate a group of channels selected from S+X, and
      vii) allocate an unused remaining member of the alternating group from S+X to an inner tier of the cell, and
   f) operating each of the base stations according to the allocated channels.

8. The method of claim 7, wherein each of the base stations comprises directional antennae, and further comprising assigning one of the allocated channels to each of the directional antennae.

9. The method of claim 8, wherein each of the directional antennae receives radio frequencies of the corresponding allocated channel.

10. A method for allocation of channels by a cellular network operator to base stations within the cells of a tile for reuse within a cellular communications system comprising:
   a) indexing the base stations (BS) within a cellular communications system according to a row (i) and a column (j);
   b) determining a co-channel interference requirement within the cellular communications system;
   c) determining the number (N) of cell types required within the cellular communications system;
   d) allocating ordinals to each of the number of cell types and setting CurrentCellType to the cell type first in sequence;
   e) labeling the cells by cell type according to:
      i) if N is even:
      ii) step 1: label cells $BS_{i,j}$, $BS_{i,j+2}$, $BS_{i+N,j}$, and $BS_{i+N,j+2}$ as CurrentCellType,
      iii) step 2: increase i by 1,
         change CurrentCellType to the cell type next in sequence,
         if the ordinal of CurrentCellType is even set j=j+1, if ordinal is odd set j=j−1,
      iv) Step 3: repeat from e) ii) step 1 for all cell types of the tile;
      v) if N is odd:
      vi) step 1: label cells $BS_{i,j}$, $BS_{i,j+2}$ as CurrentCellType,
         if the ordinal of CurrentCellType is odd, label $BS_{i+N,j+1}$ and $BS_{i+N,j+3}$ with CurrentCellType
         if the ordinal of CurrentCellType is even, label $BS_{i+N,j-1}$ and $BS_{i+N,j+1}$ with CurrentCellType,
      vii) step 2: increase i by 1,
         change CurrentCellType to the cell type next in sequence,
         if the ordinal of CurrentCellType is even set j=j+1, if ordinal is odd set j=j−1,
      viii) Step 3: repeat from e) vi) step 1 for all cell types of the tile;

f) allocating channels to each cell according to:
  allocate a distinct group of S+X channels for each cell type, where S is the number of sectors in an outer tier of a cell, and X is the number of channels needed to complete an alternation scheme providing sufficient separation between co-channels,
  then for each cell:
  allocate S of the channels from the cell type distinct group to an outer tier of a cell, subject to:
    i) if any of the allocated group of S channels can be rotated to avoid front lobe interference with its nearest co-channel cell, rotate those channels,
    ii) if i) cannot be accomplished, alternate a group of channels selected from S+X, and
    iii) allocate an unused remaining member of the alternating group from S+X to an inner tier of the cell; and
g) operating each of the base stations according to the allocated channels.

11. The method of claim 10, wherein each of the base stations comprises directional antennae, and further comprising assigning one of the allocated channels to each of the directional antennae.

12. The method of claim 11, wherein each of the directional antennae receives radio frequencies of the corresponding allocated channel.

13. A method for allocation of frequency channels by a cellular network operator to base stations within a tiered cellular communications system, wherein a geographic area serviced by the cellular communications system is divided into a plurality of cells, and each of the cells is associated with one of the base stations, and each of the base stations includes at least one antennae and has at least one assigned frequency channel, the method comprising:
  a) indexing the base stations (BS) within a cellular communications system according to a row (i) and a column (j);
  b) determining a co-channel interference requirement within the cellular system;
  c) determining the number (N) of cell types required within the cellular communications system;
  d) sequentially identifying the cell types and setting CurrentCellType to the cell type first in sequence;
  e) labeling the cells by cell type according to:
    i) if N is even:
    ii) step 1: label cells $BS_{i,j}$, $BS_{i,j+2}$, $BS_{i+N,j}$, and $BS_{i+N,j+2}$ as CurrentCellType,
    iii) step 2: increase i by 1,
      change CurrentCellType to the cell type having the ordinal next in sequence,
      if the ordinal of CurrentCellType is even set j=j+1, if ordinal is odd set j=j−1,
    iv) Step 3: repeat from e) ii) step 1 for all cell types of the tile;
    v) if N is odd:
    vi) step 1: label cells $BS_{i,j}$, $BS_{i,j+2}$ as CurrentCellType,
      if the ordinal of CurrentCellType is odd, label $BS_{i+N,j+1}$ and $BS_{i+N,j+3}$ with CurrentCellType
      if the ordinal of CurrentCellType is even, label $BS_{i+N,j-1}$ and $BS_{i+N,j+1}$ with CurrentCellType,
    vii) step 2: increase i by 1,
      change CurrentCellType to the cell type having the ordinal next in sequence,
      if the ordinal of CurrentCellType is even set j=j+1, if ordinal is odd set j=j−1,
    viii) Step 3: repeat from e) vi) step 1 for all cell types of the tile;
  f) allocating channels to each cell according to:
    allocate a distinct group of S+X channels for each cell type, where S is the number of sectors in an outer tier of a cell, and X is the number of channels needed to complete an alternation scheme meeting the co-channel interference requirement,
    then for each cell:
    designate sectors a, b, and c to an outer tier of a cell,
    allocate S of the channels from the cell type distinct group to an outer tier of a cell, subject to:
    select a rotating group of channels from S+X,
    select an alternating group of channels from S+X,
    rotate members of the rotating group sectors a and b when a cell is in another column in the same row,
    alternate members of the alternating group in sector c when a cell is in another column in the same row,
    when changing to a new row make the rotating group of the previous row the alternating group for the new row and make the alternating group of the previous row the rotating group for the new row,
    placing the new row alternating channel to minimize co-channel front lobe interference, and
    allocating any unused members of the alternating group of channels of a cell to any tiers of that cell which have not had a channel allocated thereto; and
  g) operating each of the base stations according to the allocated channels.

14. The method of claim 13 wherein N is an integer selected from the group comprising 1-7.

15. The method of claim 13 wherein S is an integer selected from the group comprising 3, 4, and 6.

16. The method of claim 13 wherein X=1.

17. The method of claim 13 wherein X=2.

18. The method of claim 13 wherein X=4.

19. The method of claim 13 wherein X is less than or equal to S.

20. The method of claim 13, wherein each of the base stations comprises directional antennae, and further comprising assigning one of the allocated channels to each of the directional antennae, wherein each of the directional antennae receives radio frequencies of the corresponding allocated channel.

* * * * *